United States Patent Office 2,756,238
Patented July 24, 1956

2,756,238
2-MERCAPTO-4-SUBSTITUTED THIAZOLES

John J. D'Amico, Charleston, W. Va., assignor to Monsanto Chemical Company, St. Louis, Mo., a corporation of Delaware No Drawing. Application October 5, 1953,
Serial No. 384,328

4 Claims. (Cl. 260—302)

This invention relates to new and useful 2-mercapto-4-substituted thiazoles and to methods of making same.

The free mercaptans of this new class of compounds may be represented by the structural formula

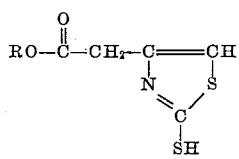

where R is hydrogen or a short chain alkyl radical. The mercapto hydrogen is active and a variety of derivatives exhibiting useful properties are obtained by replacing the hydrogen atom by salt forming groups and organic radicals. Examples of salts are zinc, lead, calcium, magnesium, sodium, potasssium, lithium, cadmium, ammonium salts, the substituted ammonium salts such as the cyclohexylammonium, dibutylammonium, isopropylammonium, dimethylammonium, diethylammonium, diisopropylammonium, dodecylammonium salts and the like. Among the organic radicals which may replace hydrogen in the mercapto group and provide for useful compounds within the scope of this invention are —CH$_2$OH, acyl groups such as benzoyl, saturated and unsaturated aliphatic groups, aralkyl groups such as benzyl and phenethyl, aromatic groups such as phenyl, tolyl, the chloro substituted-, nitro substituted- and similarly substituted benzenoid hydrocarbon groups,

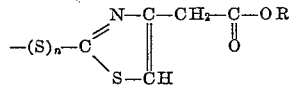

where $n$ is an integer,

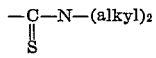

groups, NH$_2$, methylamino, ethylamino, isopropylamino, n-butylamino, sec-butylamino, tert-butylamino, n-amylamino, tert-octylamino, cyclohexylamino, α-methyl cyclohexylamino, α-ethyl cyclohexylamino, benzylamino, α-phenethylamino, furfurylamino, tetrahydrofurfurylamino, β-phenethylamino, 2-hydroxyethylamino, dimethylamino, diethylamino, diisopropylamino, diallylamino, di-n-butylamino, diamylamino, di-β-phenethylamino, di-2-thienylamino, N-methyl cyclohexylamino, dicyclohexylamino, di-2-cyanoethylamino, morpholinyl, pyrrolidinyl, piperidyl, α-methyl piperidyl, γ-methyl piperidyl, thiazinyl, —CH$_2$—NH-aryl groups,

groups where X is oxygen or sulfur.

As illustrative of the new compounds of this invention and the preparation thereof is the following:

EXAMPLE 1

*Ethyl-2-mercapto-4-thiazoleacetate*

To an agitated solution containing 113 grams (1.03 moles) of ammonium dithiocarbamate dissolved in 450 grams of water was added 170 grams (1.03 moles) of ethyl γ-chloroacetoacetate. The reaction was immediate and exothermic, the temperature of the reaction rising from 20 to 56° C. in a period of about 15 minutes. The reaction mix was stirred for an additional 24 hours, then heated at 90–100° C. for 2 hours, cooled to about 0° C. and filtered. The filter cake was washed with water until the washings were free of chloride. Upon drying there was obtained 199 grams of a white solid melting at 135–138° C. After recrystallization from benzene the product was found to melt at 139–140° C. Analysis gave 7.01% nitrogen and 31.70% sulfur as compared to 6.89% nitrogen and 31.54% sulfur calculated for C$_7$H$_9$NO$_2$S$_2$.

The intermediate NH$_2$CSSCH$_2$COCH$_2$COOC$_2$H$_5$ can be isolated if desired. After the 24 hour stirring period the reaction mixture was cooled to 0–3° C. The solid precipitate was removed by filtering, washed with water until the washings were neutral to litmus, then dried at room temperature. The melting point after recrystallizing from benzene was 74–75° C. Analysis gave 6.32% nitrogen and 29.20% sulfur as compared to 6.33% nitrogen and 28.98% sulfur calculated for C$_7$H$_{11}$NO$_3$S$_2$. Heating a water suspension of this intermediate at 90–100° C. as described results in formation of the thiazole.

Employing the procedure of Example I but replacing ethyl γ-chloroacetoacetate with an equimolecular proportion of isopropyl γ-chloroacetoacetate there is obtained isopropyl 2-mercapto-4-thiazoleacetate.

EXAMPLE 2

*2-mercapto-4-thiazoleacetic acid*

An agitated solution containing 50.8 grams (0.25 mole) of ethyl 2-mercapto-4-thiazoleacetate, 80 grams (0.5 mole) of 25% aqueous sodium hydroxide and 200 ml. of water was heated at 70–80° C. for 3 hours. The reaction mix was cooled to 5° C. and the solution acidified with concentrated hydrochloric acid maintaining the temperature at 15–20° C. The acidified solution was cooled to 5° C., filtered, and the filter cake washed with water until the washings were neutral to litmus. Upon drying there was obtained 39 grams of a tan colored solid, melting with decomposition at 154–155° C. Analysis gave 8.08% nitrogen and 36.63% sulfur as compared to 7.99% nitrogen and 36.60% sulfur calculated for C$_5$H$_5$NO$_2$S$_2$.

EXAMPLE 3

*Zinc salt of ethyl 2-mercapto-4-thiazoleacetate*

To an agitated solution containing 49 grams (0.24 mole) of ethyl 2-mercapto-4-thiazoleacetate, 38.4 grams (0.24 mole) of 25% aqueous sodium hydroxide and 800 ml. of water was added a solution containing 16.35 grams (0.12 mole) of zinc chloride in 800 ml. of water. The reaction was stirred for about 2 hours and filtered. The filter cake was washed with water until the washings were neutral to litmus. Upon drying a cream colored solid was obtained in a 90.7% yield. Analysis gave 5.97% nitrogen, 26.96% sulfur and 13.41% zinc as compared to 5.96% nitrogen, 27.29% sulfur and 13.91% zinc calculated for C$_{14}$H$_{16}$N$_2$O$_4$S$_4$Zn.

Employing the procedure of Example 3 but replacing zinc chloride with an equimolecular proportion of cadmium sulfate a white solid was obtained in 95.1% yield which on analysis gave 5.25% nitrogen, 24.45% sulfur and 22.30% cadmium as compared to 5.42% nitrogen, 24.81% sulfur and 21.74% cadmium calculated for C$_{14}$H$_{16}$N$_2$O$_4$S$_4$Cd.

EXAMPLE 4

Diethyl 2,2'-dithiobis (4-thiazoleacetate)

To a stirred suspension of 50.8 grams (0.25 mole) of ethyl 2-mercapto-4-thiazoleacetate in 300 ml. of water, a solution containing 63 grams (0.275 mole) of ammonium persulfate in 147 grams of water was added dropwise at 25–30° C. over a period of 30 minutes. The reaction mixture was stirred for an additional two hours and then the upper water layer was decanted. The lower oily layer was dissolved in 400 ml. of ethyl ether, the ether extract washed with 200 ml. of 2% sodium hydroxide solution, then with water until the washings were neutral to litmus, dried over sodium sulfate and the ether removed in vacuo. The resulting solid was air dried at room temperature. The yield was 33 grams (65.4%), M. P. 32–33° C. Analysis gave 7.03% nitrogen and 31.77% sulfur as compared to 6.93% nitrogen and 31.71% sulfur calculated for $C_{14}H_{16}N_2O_4S_4$.

EXAMPLE 5

Ethyl 2-(N,N-diethyldithiocarbamyl)-4-thiazoleacetate

To a stirred solution containing 50.8 grams (0.25 mole) of ethyl 2-mercapto-4-thiazoleacetate, 10 grams (0.25 mole) of sodium hydroxide, 500 ml. of acetone and 20 grams of water was added at 28–32° C. 38 grams (0.25 mole) of N,N-diethylthiocarbamyl chloride dissolved in 200 ml. of acetone over a period of ten minutes. The reaction mixture was stirred for 4 hours and sodium chloride removed by filtration. The acetone was removed in vacuo, the residue dissolved in 500 ml. of ether, the ether solution washed with 100 ml. of 2% sodium hydroxide solution, then with water until the washings were neutral to litmus, dried over sodium sulfate, and the ether removed in vacuo. The product, a dark amber oil, was obtained in 84.3% yield. Analysis gave 8.69% nitrogen and 29.84% sulfur as compared to 8.80% nitrogen and 30.20% sulfur calculated for $C_{12}H_{18}N_2O_2S_3$.

EXAMPLE 6

2,4,6-tris (4-carbethoxymethyl-2-thiazolylmercapto)-s-triazine

To a stirred solution containing 50.9 grams (0.25 mole) of ethyl 2-mercapto-4-thiazoleacetate, 14 grams (0.25 mole) of potassium hydroxide and 400 ml. of acetone, was added 15.4 grams (0.0833 mole) of cyanuric chloride dissolved in 100 ml. of acetone. An exothermic reaction set in, causing the temperature to rise from 25° to 42° C. over a period of ten minutes. The reaction mixture was heated at 55–56° C. for 5 hours, cooled to room temperature and the potassium chloride removed by filtration. Upon removal of the acetone in vacuo, the desired product was obtained as a resinous solid in a yield of 88%. Analysis gave 12.10% nitrogen as compared to 12.27% nitrogen calculated for $C_{24}H_{24}N_6O_6S_6$.

EXAMPLE 7

2,2'-dithiobis (4-thiazoleacetic acid)

To an agitated suspension of 79 grams (0.45 mole) of 2-mercapto-4-thiazoleacetic acid in 400 ml. of water was added dropwise 239 ml. (0.45 mole) of a 30% aqueous solution of ammonium persulfate over a one and one-half hour period at 25–30° C. After stirring for 2 hours longer, the precipitate was filtered and dried at 50° C. The yield was 75 grams (95.6%), M. P. 150–151° C. with decomposition. After recrystallization from ethyl alcohol there was no change in melting point. Analysis gave 7.88% nitrogen and 36.53% sulfur as compared to 8.04% nitrogen and 36.81% sulfur calculated for $C_{10}H_8N_2O_4S_4$.

EXAMPLE 8

Ethyl 2-(3-chloro-2-butenylmercapto)-4-thiazoleacetate

To a stirred solution containing 69 grams (0.34 mole) of ethyl 2-mercapto-4-thiazoleacetate, 19.1 grams (0.34 mole) of potassium hydroxide, 300 ml. of acetone and 10 grams of water, there was added 42.5 grams (0.34 mole) of 1,3-dichloro-2-butene. An exothermic reaction set in causing the temperature to rise from 30° to 51° C. over a period of two minutes. The reaction mixture was heated at 55–56° C. for 6 hours, cooled to room temperature and the potassium chloride removed by filtration. The acetone was removed in vacuo, the two layers were separated, and the organic layer dried over sodium sulfate. The product, an amber colored oil, was obtained in 67.5% yield. Analysis gave 21.98% sulfur and 11.83% chlorine as compared to 21.98% sulfur and 12.15% chlorine calculated for $C_{11}H_{14}ClNO_2S_2$.

EXAMPLE 9

Ethyl 2-(2-chloroallylmercapto)-4-thiazoleacetate

To a stirred solution containing 50.8 grams (0.25 mole) of ethyl 2-mercapto-4-thiazoleacetate, 40 grams (0.25 mole) of 25% aqueous sodium hydroxide and 300 ml. of water was added 27.9 grams (0.25 mole) of 2,3-dichloro-1-propene. An exothermic reaction set in, causing the temperature to rise from 25–30° C. over a period of one hour. The reaction mixture was stirred for 5 hours, extracted with 500 ml. of ethyl ether, the ether extract washed with 300 ml. of 2% sodium hydroxide, then with water until the washings were neutral to litmus, dried over sodium sulfate and the ether removed in vacuo. The product, an amber oil, was obtained in 59.1% yield. Analysis gave 5.02% nitrogen, 23.09% sulfur and 12.46% chlorine as compared to 5.04% nitrogen, 23.08% sulfur and 12.76% chlorine calculated for $C_{10}H_{12}ClNO_2S_2$.

EXAMPLE 10

Ethyl 2-(3-chloroallylmercapto)-4-thiazoleacetate

Substituting 27.9 grams (0.25 mole) of 1,3-dichloropropene for the 2,3-dichloro-1-propene in Example 9 yielded 45 grams (64.9%) of an amber oil. Analysis gave 4.90% nitrogen and 22.84% sulfur as compared to 5.04% nitrogen and 23.08% sulfur calculated for $C_{10}H_{12}ClNO_2S_2$.

EXAMPLE 11

Ethyl 2-(2-propynylmercapto)-4-thiazoleacetate

A solution of sodium ethyl-2-mercapto-4-thiazoleacetate was prepared by mixing 50.8 grams (0.25 mole) of ethyl 2-mercapto-4-thiazoleacetate, 250 grams of water and 40 grams (0.25 mole) of 25% sodium hydroxide. To the stirred solution, 29.8 grams (0.25 mole) of propargyl bromide was added. An exothermic reaction set in, the temperature rising from 30 to 36° C. over a period of five minutes. The reaction mixture was stirred for 5 hours, extracted with 500 ml. of ethyl ether, the ether solution washed with water until the washings were neutral to litmus, dried over sodium sulfate and the ether removed in vacuo. The product, a dark amber oil, was obtained in 49.8% yield. Analysis gave 5.67% nitrogen and 26.33% sulfur as compared to 5.80% nitrogen and 26.57% sulfur calculated for $C_{10}H_{11}NO_2S_2$.

The new compounds comprise biological toxicants and accelerators for the vulcanization of rubber. As illustrative of the vulcanization accelerating properties of the new compounds of this invention, the following sulfur-vulcanizable rubber stocks were compounded comprising:

| Stock | A | B |
|---|---|---|
| | Parts by weight | Parts by weight |
| Butadiene-styrene copolymer (GR-S 100) | 100 | 100 |
| Furnace carbon black | 50 | 50 |
| Saturated hydrocarbon softener | 10 | 10 |
| Zinc oxide | 4 | 4 |
| Stearic acid | 2 | 2 |
| Sulfur | 1.75 | 1.75 |
| 2-Mercaptobenzothazole | 1.2 | |
| Ethyl 2-mercapto-4-thiazoleacetate | | 1.2 |

The stocks so compounded were cured in the usual manner by heating in a press for various periods of time at 144° C. The physical properties obtained are set forth below:

| Stock | Time of Cure in Mins. | Modulus of Elasticity in lbs./in.² at Elongations of— | | | Tensile at Break in lbs./in.² | Ultimate Elongation, percent |
|---|---|---|---|---|---|---|
| | | 300% | 500% | 700% | | |
| A | 30 | 216 | 376 | 466 | 486 | 1,123 |
| B | 30 | 253 | 400 | 480 | 503 | 970 |
| A | 60 | 490 | 966 | 1,390 | 1,630 | 900 |
| B | 60 | 430 | 806 | 1,096 | 1,243 | 850 |
| A | 90 | 735 | 1,470 | 2,205 | 2,450 | 835 |
| B | 90 | 633 | 1,210 | 1,713 | 1,886 | 800 |

As further illustrative of the utility of the novel compounds of this invention but particularly those wherein the mercapto group of the mercaptothiazoles of this invention are replaced by a di-short chain alkyl dithiocarbamyl radical, rubber stocks were compounded comprising:

| Stock | C | D |
|---|---|---|
| | Parts by weight | Parts by weight |
| Butyl rubber | 100 | 100 |
| Carbon black | 54 | 54 |
| Zinc oxide | 5 | 5 |
| Stearic acid | 1 | 1 |
| Sulfur | 1.5 | 1.5 |
| Tetramethyl thiuram disulfide | 1.0 | 1.0 |
| Ethyl 2-(N,N-diethyldithiocarbamyl-4-thiazole-acetate | 0.5 | |
| 2-Mercaptobenzothiazole | | 0.5 |

The stocks so compounded were cured in the usual manner by heating in a press for different periods of time at 330° F. The physical properties obtained are set forth below:

TABLE II

| Stock | Time of Cure in Mins. | Modulus of Elasticity in lbs./in.² at Elongation of— | | Tensile at Break in lbs./in.² | Ultimate Elongation, percent |
|---|---|---|---|---|---|
| | | 300% | 500% | | |
| C | 15 | 670 | 1,310 | 1,690 | 675 |
| D | 15 | 830 | 1,430 | 1,620 | 610 |
| C | 60 | 945 | 1,550 | 1,550 | 500 |
| D | 60 | 1,060 | | 1,365 | 435 |
| C | 90 | 1,030 | | 1,380 | 400 |
| D | 90 | 940 | | 1,380 | 490 |

It is intended to cover all changes and modifications of the examples of the invention herein chosen for purposes of disclosure which do not constitute departure from the spirit and scope of the invention.

What is claimed is:

1. As new compounds 2-mercapto-4-substituted thiazoles of the structural formula

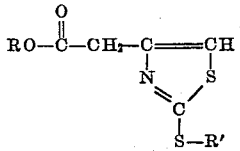

where R is selected from the group consisting of hydrogen and lower alkyl radicals and where R' is selected from the group consisting of hydrogen, metal salt forming groups, ammonium, and cyclohexyl, alkyl and dialkyl ammonium radicals containing less than 13 carbon atoms.

2. As new compounds 2-mercapto-4-substituted thiazoles of the structural formula

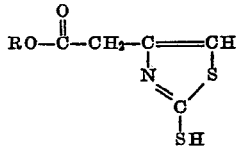

where R is a lower alkyl radical.

3. As a new compound ethyl 2-mercapto-4-thiazoleacetate.

4. As a new compound 2-mercapto-4-thiazoleacetic acid.

References Cited in the file of this patent

UNITED STATES PATENTS 2,133,969 Buchman ---------------- Oct. 25, 1938
2,196,607 Mathes ---------------- Apr. 9, 1940

OTHER REFERENCES

Cook et al.: Chem. Abst., vol. 43, col. 1398 (1949).
Swain: Chem. Abst., vol. 44, col. 3976 (1950).
Levi: Chem. Abst., vol. 26, page 1602 (1932).
Ubaldini et al.: Chem. Abst., vol. 38, col. 5827 (1944).